United States Patent Office 2,942,866
Patented June 28, 1960

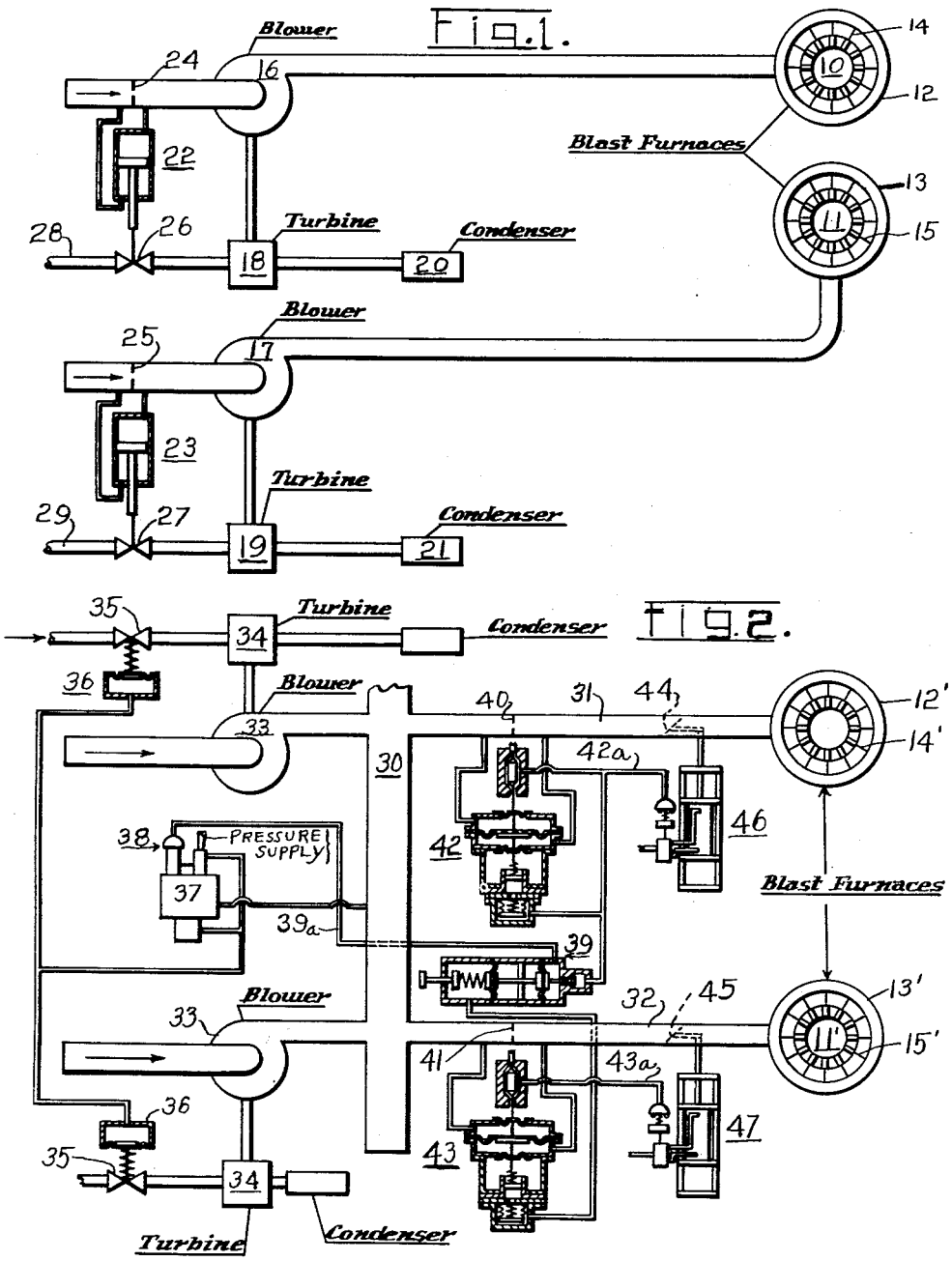

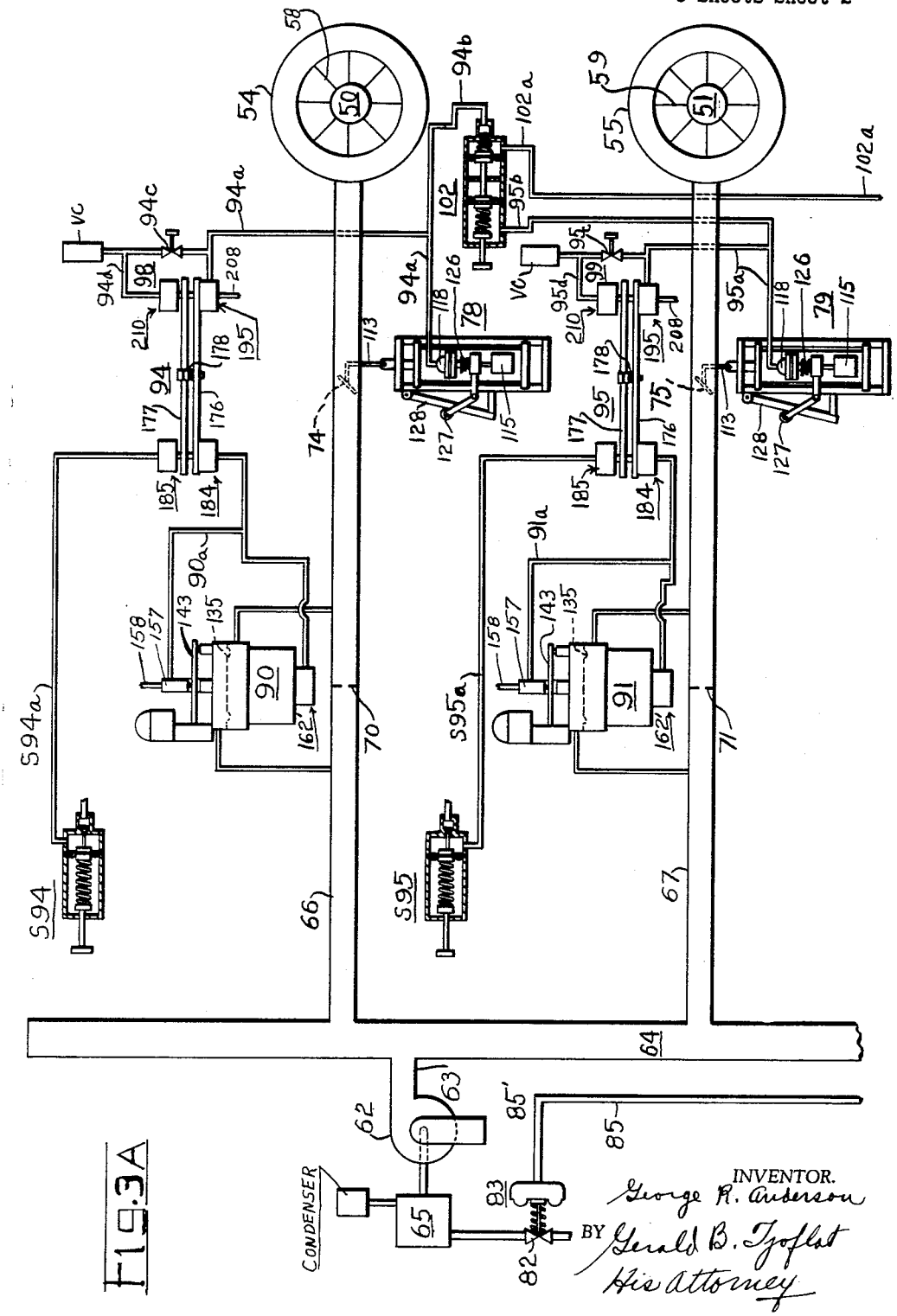

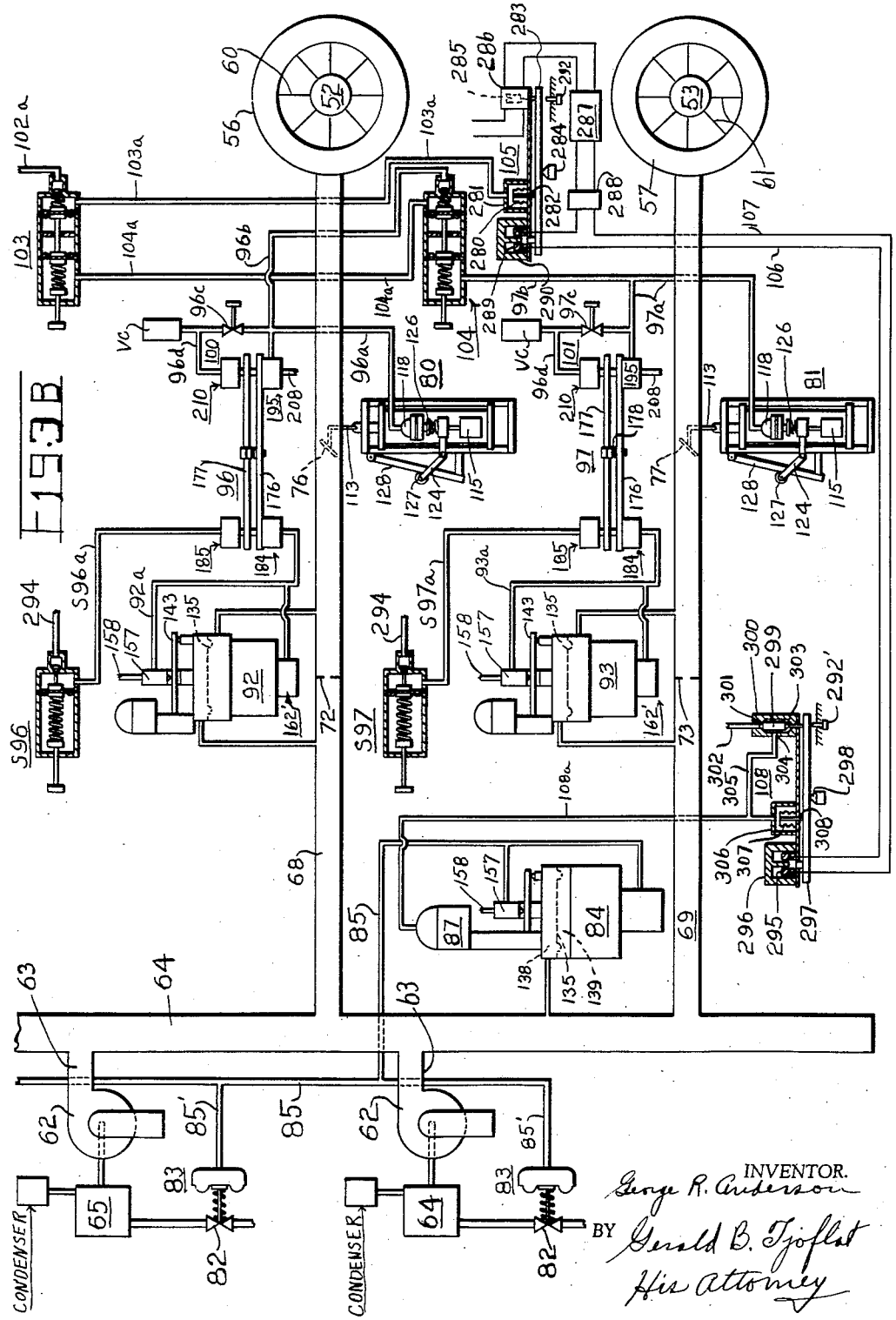

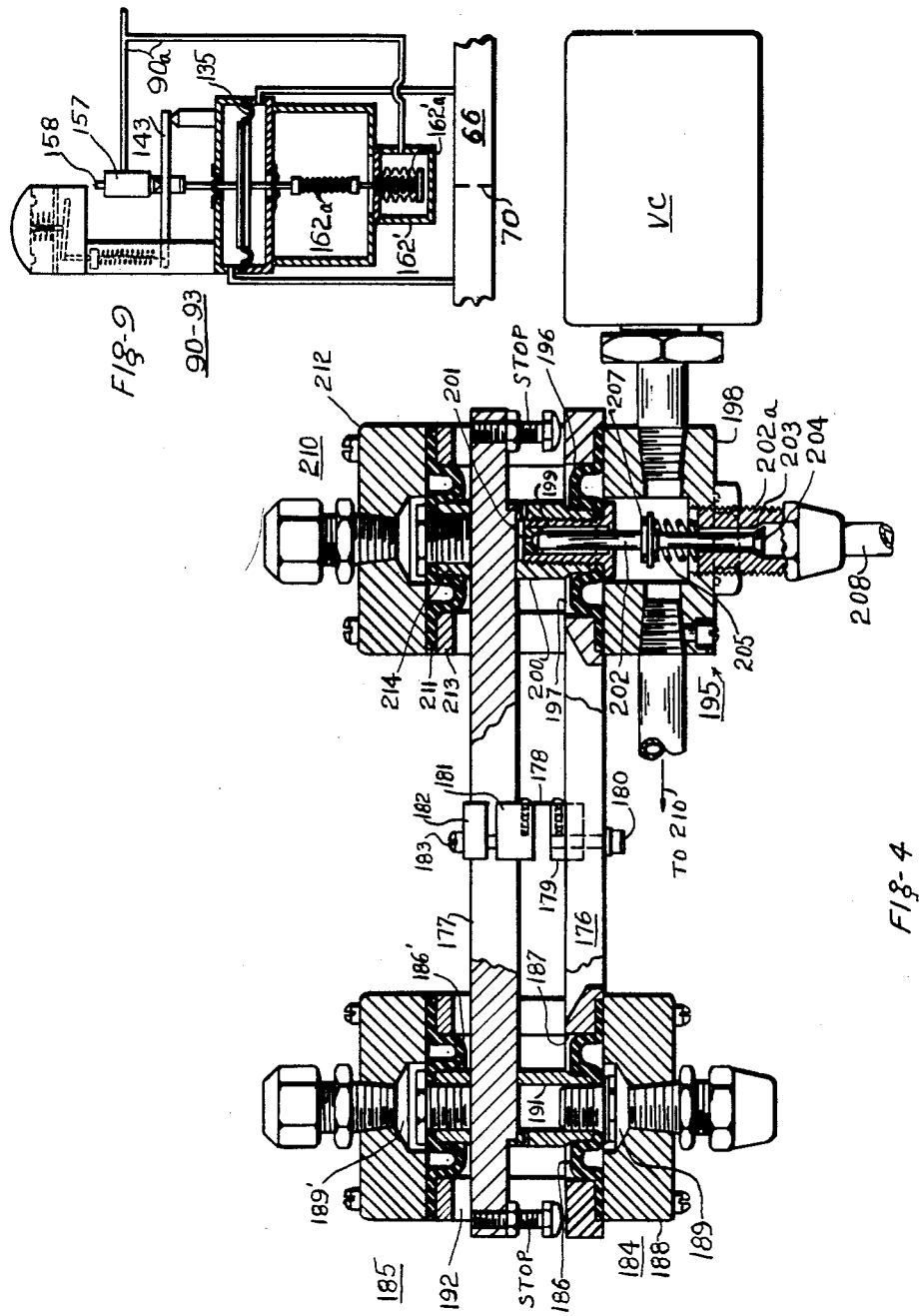

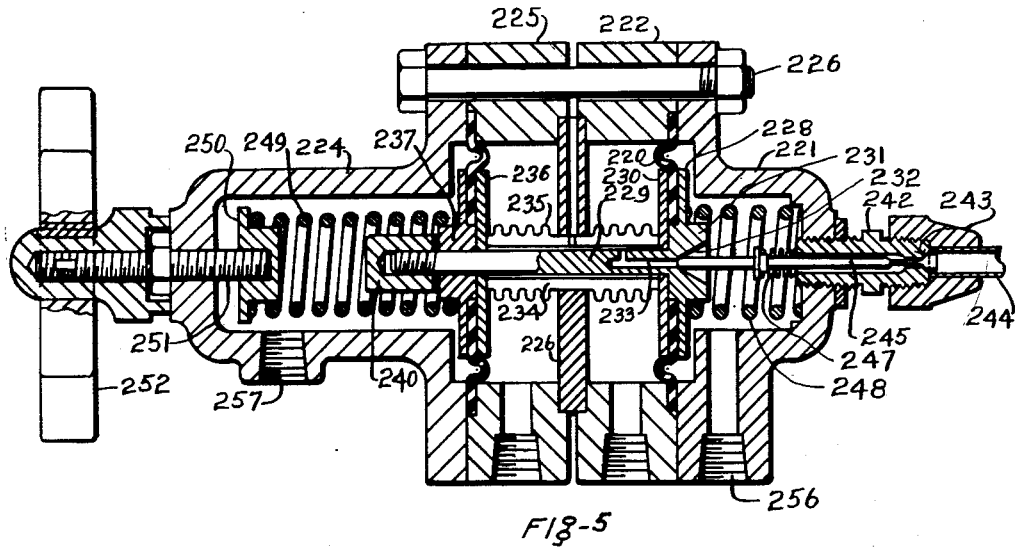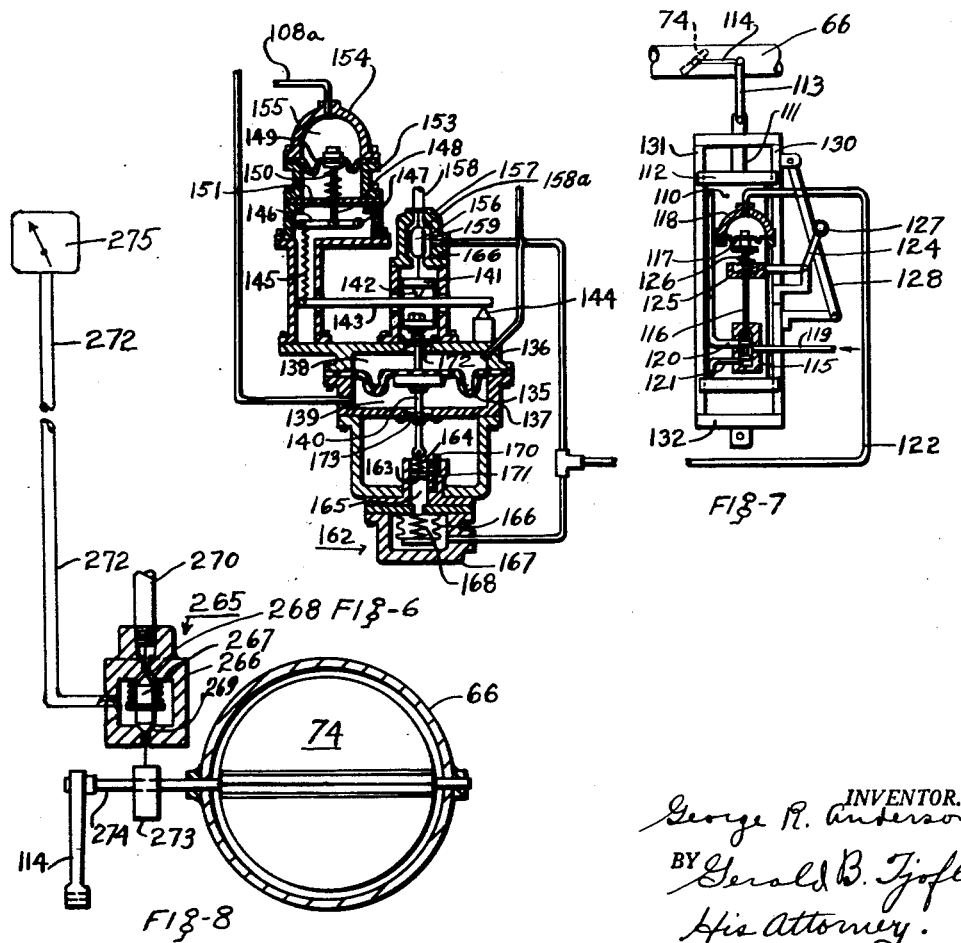

2,942,866

APPARATUS FOR DISTRIBUTING WIND FROM A PLURALITY OF TURBINE DRIVEN BLOWERS TO THE BUSTLE PIPES OF A PLURALITY OF BLAST FURNACES

George R. Anderson, Mount Lebanon, Pa., assignor to Hagan Chemicals & Controls Inc., Pittsburgh, Pa., a corporation of Pennsylvania Filed June 3, 1957, Ser. No. 663,079

5 Claims. (Cl. 266—30)

This invention relates to blast furnaces and more particularly to a method of and apparatus for supplying to the bustle pipes of a plurality of blast furnaces the amount of wind required for most economic and efficient operation of the wind system.

Prior to this invention, it was the practice to supply each of several blast furnaces of a steel mill with wind by its own steam turbine driven blower. The volume of wind delivered to any one of a plurality of those furnaces was controlled by the speed of the blower for that furnace. The various blower speeds required for any one blast furnace were obtained by adjusting the steam input to its turbine. The volume of wind delivered to any given furnace was regulated by a wind volume controller that so adjusted the turbine speed as to hold the volume constant at a preset but adjustable value.

The basic principle of the above volumetric control of wind to a blast furnace is illustrated in Figure 1. Where many blast furnaces were involved in a given installation, the above system of supplying wind to each blast furnace was uneconomical in that the blowers usually had much more capacity than was ever used. Furthermore, it was not economical to operate the turbines and the blowers driven thereby over a wide range of speeds.

It has also been proposed to connect the several turbine driven blowers to a common header and then supplying the wind to the bustle pipes of the several blast furnaces from that header through a separate header or supply pipe and regulating the supply of air to each bustle pipe by means of dampers or valves operated by volumetric controllers. This system was not economical because there would be times when the pressure on the down stream side of the butterfly valve would be say 20 pounds per square inch and the pressure on the upstream side might be 25 pounds per square inch. Therefore, in such a case the pressure would have to be reduced 5 pounds per square inch, and that reduction dissipated in the butterfly valve.

It has been found for example, that when the wind pressure on the upstream side of the butterfly valve is say 5 pounds above that on the downstream side, the cost of driving the turbine for maintaining that differential is about $5.00 per hour or about $120.00 per day. Therefore, where there are several or more blast furnaces in an installation and these furnaces are operated continuously year in and year out, the cost of the extra steam consumption resulting from pressure reductions across the butterfly valves in the bustle supply pipes, is very substantial over a year's time.

In accordance with this invention, a plurality of steam-driven blowers are utilized to supply the wind or blast to a common header. The bustle pipe of each of the several blast furnaces is supplied with blast by a supply or header pipe from that common header. Each header pipe is provided with an orifice and a butterfly valve.

In order to utilize efficiently the capacity of the blowers and at the same time so operating the blowers that the turbines operate at an economical steam consumption, the supply of wind through the several header pipes to the bustle pipes of the respective furnaces is so controlled that one of the bustle pipes will receive the required amount of wind at substantially a zero pressure differential across the butterfly valve in its header pipe. In that case the butterfly valve in that pipe will be in open position. The valves in the other header pipes are then so modulated as to maintain volumetrically controlled supplies to each of the other bustle pipes. The system is so arranged that a butterfly valve in one of the header pipes will be automatically selected for wide open position when the furnace supplied by that header pipe receives enough wind when its valve is wide open. By wide open is meant that position of the valve which has substantially no regulating or throttling effect on flow. In that situation the pressure at the bustle pipe will be substantially equal to the pressure in the common header.

Also the system is so arranged that it will automatically select the particular butterfly that is to be actuated to a wide open position. If, while a given valve is in wide open position, there is a tendency towards deficiency in wind to any one of the furnaces, a regulator responsive to the header pressure will be so loaded as to increase the speeds of the turbines thereby increasing the header pressure so that all of the bustle pipes of the blast furnaces will receive the required amount of wind.

An object of this invention is to provide a system of supplying wind to the bustle pipes of a plurality of blast furnaces that utilizes in part the volumetric control of wind as in the prior art and in part a system of individual regulation of wind from a common header coupled with the feature of operating a selected valve in a given bustle supply pipe to a wide open position and then modulating the other valves so that each furnace receives its required amount of wind.

A further object is to provide a system that operates to automatically select a particular valve that is to be set in the wide open position, that valve being in the header pipe to the furnace requiring the lowest differential between the header pressure and the bustle pipe pressure to provide the wind volume required by that furnace.

A further object of the invention is to provide a method of supplying wind to a plurality of blast furnaces that consists in supplying wind from a plurality of blowers to a common header, distributing wind to each of a plurality of furnaces through separate ducts or pipes, measuring the volumetric flow in each duct, selecting the particular duct that requires the least pressure difference between the header pressure and the bustle pipe pressure to maintain the desired flow for that furnace, and then so modulating the flows in the supply pipes to the other blast furnaces that all of the furnaces receive the required amount of wind.

A further object is to provide a method in accordance with the next preceding object in which the header pressure is controlled by adjusting the supply of wind to the header in accordance with the demand by the furnace requiring the lowest wind pressure to its bustle pipe.

The above and other objects of the invention will be apparent to those of ordinary skill in the art to which the invention pertains from the following description taken in conjunction with the accompanying drawings.

In the drawings:

Figure 1 is a more or less diagrammatic view of the manner in which wind was supplied to the bustle pipes of blast furnaces prior to the invention;

Fig. 2 is a more or less schematic view of a system showing a combination of the prior art of Fig. 1 together with an improvement embodying this invention whereby the blast furnace requiring the lowest wind pressure is supplied with wind at a pressure substantially equal to the pressure in the header and the other furnace is supplied with a modulated pressure in accordance with the volumetric rate of flow required by that furnace;

Figs. 3a and 3b, together, constitute a more or less diagrammatic view of a control system embodying the principles of Fig. 2, as applied to an installation involving four blast furnaces;

Fig. 4 is an enlarged view partly in section of a ratio totalizer embodied in the system of Figs. 3a and 3b;

Fig. 5 is a view in longitudinal section of a totalizer embodied in the system of Figs. 3a and 3b;

Fig. 6 is a more or less diagrammatic view in section of a regulator utilized in the system of Figs. 3a and 3b;

Fig. 7 is a more or less diagrammatic view of a power cylinder or operator for positioning the butterfly valves in the control system;

Fig. 8 is a view in section of a header pipe showing the butterfly valve provided with a cam and an escapement valve by means of which the position of the valve may be determined from a remote point by the value of the transmitted pressure of the escapement valve; and Fig. 9 is a view in section of a graded regulator.

As stated supra, the prior art apparatus utilized for supplying wind to a blast furnace is shown in Fig. 1. In that view, two blast furnaces 10 and 11 are shown schematically. They are provided with bustle pipes 12 and 13, respectively. Air is supplied from the respective bustle pipes to the tuyeres of the furnaces through tuyere pipes 14 and 15. The bustle pipes 12 and 13 are supplied with wind from separate blowers 16 and 17 driven by steam turbines 18 and 19, respectively. The respective turbines exhaust to condensers 20 and 21.

The wind supplied by each of the blowers 16 and 17 is controlled volumetrically, the turbine speeds being regulated to give the preset volume of wind required by each furnace. As shown, the intake pipes of the blowers 16 and 17 are provided with regulators 22 and 23 that respond to the pressure difference across the respective orifices 24 and 25 in the intake pipes. The regulators 22 and 23 operate steam valves 26 and 27, respectively, in the steam supply lines 28 and 29 for the respective turbines. The regulators 22 and 23 are of a design that will so adjust the turbine speeds that the differentials across the orifices 24 and 25 will be held constant at some preselected but adjustable value.

While in a system such as shown in Fig. 1, each furnace could be supplied with its wind requirements, the system did not utilize blower capacity economically, nor did it utilize steam efficiently. The blower capacity usually was much greater than required and in order for the blower to meet the demands of the furnace, the speed of the blower and of the turbine had to be adjusted over a wide range which militated against good economy; and furthermore, steam economy was poor because the turbines were not operated long enough during a 24-hour period at their most efficient loads.

In Fig. 2, a system is shown that utilizes a common supply header 30 from which the bustle pipes 12' and 13' of the furnaces 10' and 11' are supplied by bustle supply pipes 31 and 32. The header 30 may be supplied by one or more blowers 33 driven by steam turbines 34. The combined capacities of the blowers may be one that is more nearly equal to the maximum wind demand of the two furnaces. Therefore, these turbines will be operated more nearly at their most efficient loads or capacities. The turbine speeds are regulated by steam valves 35 which are actuated by operators 36. The operators 36 are simultaneously controlled by a regulator 37 that responds to the pressure in the header 30. The regulating point of regulator 37 is controlled by a loader 38 which is so loaded by a totalizer 39 that the regulating point of regulator 37 is either raised or lowered, depending on the demand for wind by the furnaces. The loader 38 operates to lower the regulating point of the regulator as the loading pressure on it increases and to raise it as the loading pressure decreases. This aspect of the loader will be explained infra in connection with the description of the regulator 37 which is shown in Fig. 6.

The respective header pipes 31 and 32 are provided with orifices 40 and 41, respectively, volumetric regulators 42 and 43 that respond to the pressure differences across the respective orifices, and flow regulating valves 44 and 45. The valves are operated by operators or power cylinders 46 and 47, whose pilot valves receive control signals through pipes 42a and 43a, respectively. Cylinder 46 is controlled by regulator 42 and cylinder 47 by regulator 43.

The output signal of one or the other of the volumetric regulators 42, 43 is utilized as the supply pressure for the totalizer 39. As shown, the output signal in pipe 42a of regulator 42 constitutes the supply for the totalizer. The output signal in pipe 43a of regulator 43 is utilized as the input to the totalizer. The output of totalizer 39 is transmitted through a pipe 39a to the loader 38 of the header regulator 37. The value of the output signal of totalizer 38 can be equal to, but never exceed the value of its signal supply pressure which is the output signal in line 42a of regulator 42. Thus the output signal of the totalizer 39 will be proportional to the difference between the output signals of regulators 42 and 43, but in no case can it exceed that of regulator 42 even when the output signal of regulator 43 exceeds that of regulator 42.

So long as the output signal of regulator 43 is less than that of regulator 42 there will be a loading pressure on the loader 38 of regulator 37. That loading pressure tends to decrease the pressure of the wind in the header by effecting a reduction in the steam input to the turbines that drive the blowers. So long as the pressure differential across the orifice in pipe 31 is zero, the output pressure of regulator 42 will be zero. In that situation there will be no output pressure from the totalizer 39 and consequently there will be no loading pressure on the loader 38. Therefore, the regulator 37 will operate to maintain a higher pressure in the header so as to make certain that the flow through the header pipe 31 is at least equal to the demand required by the furnace supplied by that pipe.

If the resistance to flow to the furnace supplied by header pipe 31 should decrease, thereby causing a greater flow of wind through that header pipe, then the regulator 42 will develop an output signal which will cause the power cylinder 46 to move the damper or butterfly valve 44 towards closed position. As that valve moves towards closed position, the output signal of regulator 42 increases, which increases the supply pressure of totalizer 39. With that increased supply pressure to the totalizer, then any signal delivered by the regulator 43 to the totalizer will cause the totalizer output to increase and act on the loader 38 of regulator 37 to lower its regulating point. Regulator 37 will therefore reduce the steam input to the turbines and thereby cut back on the pressure of the wind in the header 30 until the pressure therein is at the required lower value.

As arranged, the system shown in Fig. 2 will actuate either the valve 44 or the valve 45 to its wide open or non-regulating position, the other valve being modulated to maintain the wind flow required by its furnace. An advantage in such a system lies in the fact that power is not wasted in the valve which is held in open position, which would be the case if each one had to reduce the wind pressure by throttling action to a value below that in the header. As stated supra, it costs at the present time about $5.00 per hour in steam consumption to maintain a pressure difference of 5 pounds per square inch across a valve in the bustle supply pipe. To maintain a higher differential than that would necessarily entail a greater cost per hour in steam consumption. Therefore, if the valve requiring the lowest pressure drop is kept open, a big saving is realized in the over all operation of the blast furnaces.

In Figs. 3a and 3b, a system is shown embodying the invention as applied to a larger number of blast furnaces, specifically four, namely furnaces 50, 51, 52 and 53. The respective furnaces are provided with bustle pipes 54, 55, 56 and 57. The respective bustle pipes are connected to the tuyeres of the respective furnaces by tuyere pipes 58, 59, 60 and 61. Equal distribution of wind among the tuyere pipes of each furnace may be effected by a system such as disclosed in the copending application of Mitchell J. Boho, Serial No. 606,089, filed August 24, 1956.

The wind for the furnaces may be derived from a plurality of blowers 62 that deliver wind through pipe 63 to a common header 64. The blowers are driven by steam turbines 65. The several bustle pipes of the blast furnaces are supplied by the header 64 through supply pipes 66, 67, 68 and 69, respectively. The respective bustle supply pipes are provided with orifices 70, 71, 72 and 73 and flow control dampers or valves 74, 75, 76 and 77. The valves or dampers 74–77 are actuated to open, closed or intermediate positions by operators or power cylinders 78, 79, 80 and 81, respectively.

The wind pressure in header 64 is determined by the speed of the blowers 62 or the power input to the turbines as steam flow. Thus the steam supply to each turbine is regulated by a valve 82 which is positioned by a diaphragm operator 83. Each operator is supplied with controlled pressure by a loaded regulator 84 that responds to the wind pressure in the header 64. The regulator 84 may be of the same construction as regulator 37 of Fig. 2. As will be described infra, it is loaded in such a manner as to cause the regulator to establish the blower speeds necessary to maintain the pressure in the header 64 required for assuring the proper supply of wind to the blast furnaces.

The output pressure of regulator 84 is delivered to the operators 83 through a signal pipe 85 and branch pipes 85'. As the signal decreases because of a decrease in the pressure in header 64 from the regulated value, the pressure on the diaphragms of operator 83 is likewise decreased; therefore, the valves 82 are opened wider by spring 86 against which the diaphragms work. The turbine and the blower speeds will increase until the header pressure is restored to its particular regulated or controlled point value. The control point is changed, raised or lowered by the loader 87 on the regulator. The loaded regulator 84 may be of the same general construction as regulator 93 shown in Fig. 7 of Patent No. 2,689,780.

The respective power cylinders 78–81 are controlled by graded regulators 90, 91, 92 and 93, respectively, as shown in Fig. 9. Regulator 90 responds to the pressure difference or differential across the orifice 70 in pipe 66; similarly, the regulators 91–93 respond to the differentials across the respective orifices 71–73. The output signals of regulators 90–93 are directly proportional to the pressure differentials across the orifices 70–73.

The regulators 90–93 are shown as being relatively simple differential devices in order not to complicate the disclosure of the system. They may be constructed as shown in Fig. 4 of M. J. Boho application Serial No. 606,089, filed August 24, 1956, now Patent No. 2,904,327, issued September 15, 1959. However, it will be understood by those skilled in this art that these regulators may be so constructed that the output signals thereof will be compensated for temperature and pressure of the wind on the downstream sides of the orifices 70–73, so that the wind supplied to each of the blast furnaces will be regulated on a weight basis.

The output signals of the respective regulators may be transmitted directly to the respective operators 78–81 or through adjustable ratio relays 94–97. These ratio relays may be utilized also as a means for causing the power operators 78–81 to be so adjusted that the wind flow to each bustle pipe will be regulated against a set point established from the wind house or a control station (not shown). In Fig. 4 the construction of a form of the ratio relays 94–97 is shown. It will be described infra. The respective ratio relays may also be provided with rate action automatic reset means 98, 99, 100 and 101, respectively.

In order that all of the furnaces 50–54 may receive their wind requirements, the regulators 90–93 and the respective ratio relays 94–97 associated therewith, are so arranged that the damper in any one of the supply pipes 66–69 having the lowest pressure drop across the orifice in that line, will be actuated by its power cylinder to open position. To establish the wind pressure in the header 64, that is required by the controlling positions of the dampers in pipes 66–69, a plurality of totalizing devices 102–104 are provided. These totalizers are connected in a particular manner, as shown, to the output signals of the respective ratio relays 94–97, as will be described infra.

In order to control the output signal range of the ratio relays, set point relays S94–S97 are provided. These set point relays so load their respective ratio relays that the output signals of the regulators 90–03 must reach a certain value in response to increasing pressure drops across their associated orifices 70–73, before the output signals of these regulators match or equal the set points of the particular relays S94–S97 involved. If the differential across any one of the aforesaid orifices 70–73 continues to rise or increase after the set point signal has been matched by the output of the regulator involved, the output of that ratio relay will rise linearly with the regulator output signal. That output signal causes its associated power cylinder to move its damper towards closed position and it will reach that position when the output signal of the regulator has reached its maximum value.

The output signal range of regulators 90–93 may be zero to 60 p.s.i.g. If the set point pressure on its associated ratio relay is 30 p.s.i.g., the output signal range of that ratio relay will be zero to 30 p.s.i.g. Thus, if the set point signal on any one of the ratio relays 94–97 is SP, the maximum output signal of such a relay will be the maximum signal ($P_{max}$) of the associated regulator minus the set point pressure SP. The set point pressure SP can be individually preset according to the requirements of the furnaces, so that maximum output range of each ratio relay may be caused to fall within any predetermined part of the full output signal range of their associated regulators 90–93.

The output signal of regulator 90 is delivered through a signal pipe 90a to a pressure receiving unit of ratio 94. The output signal of ratio regulator 94 is delivered through a pipe 94a to the pilot valve power cylinder 78 and through a pipe 94b to the valve supply of totalizer 102.

The output signal of regulator 91 is delivered by a signal pipe 91a to a pressure receiving unit of ratio relay 95 and the output signal of that ratio relay is delivered to a pipe 95a to the pilot valve of power cylinder 79. That signal is also delivered through a pipe 95b to the input of totalizer 102.

The output signal of regulator 92 is delivered through a signal pipe 92a to a pressure receiving unit of ratio relay 96 and its signal pressure output is delivered by a pipe 96a to the pilot valve of regulator 80 and by a pipe 96b to the valve supply fitting of totalizer 104. The output signal of totalizer 103 is transmitted through a pipe 103a to a transducer 105.

The output signal of regulator 93 is delivered by a pipe 93a to a pressure receiving unit of ratio relay 97 and its signal pressure output is delivered by a pipe 97a to the pilot valve regulator 81 and by a pipe 97b to the input of totalizer 104. The output of totalizer 104 is transmitted through a signal pipe 104a to the input of totalizer 103.

The set point pressure of the sender S94 is delivered through a pipe S94 to the set point pressure receiving unit of ratio relay 94; the output pressure of the set point sender S95 is delivered through a pipe S95a to the set point pressure receiving unit of ratio relay 95; the set point pressure of sender S96 is delivered through a pipe S96 to the set point pressure receiving unit of ratio relay 96; and the set point pressure of sender S97 is delivered through a pipe S97a to the set point pressure receiving unit of ratio regulator 97.

As above stated, the totalizers 102–104 are so interconnected with each other and to the output signals of the ratio relays 94–97, that totalizer 103 develops an output signal for establishing the control point pressure of regulator 84. By "control point" pressure of regulator 84 is meant the pressure which that regulator will attempt to maintain in the main header 64.

In the specific illustration of Figs. 3a–3b, there are three totalizers, one less than the number of furnaces shown. Each totalizer includes a valve having pressure supply connection, diaphragms and pressure input connections so arranged that the output signal of each totalizer is proportional to its input signal. As shown, the supply pressure for totalizer 102 is the output signal pressure of ratio relay 94, it being the same signal that is supplied to the pilot valve of power cylinder 78. The output signal of totalizer 102 constitutes the valve supply pressure of totalizer 103 and the output signal of that totalizer is utilized in connection with the regulator 84 to adjust the controlled value of the pressure in the header 64.

The valve supply pressure of totalizer 104 is derived from the output signal of the ratio relay 96, it being the same pressure that is supplied to the pilot valve of power cylinder 80.

The input signal pressure of totalizer 102 is derived from the output signal of ratio relay 95, it being the same signal that is delivered to the pilot valve of power cylinder 79.

The input signal to totalizer 103 is the output signal of totalizer 104 and the input signal for totalizer 104 is the output signal pressure of ratio relay 97, it being the same signal that is delivered to the pilot valve of power cylinder 81.

The output signal of totalizer 102 is proportional to its input signal, which is the output signal of ratio relay 95, but it can never exceed the output signal of relay 94, which is its valve supply pressure.

The output signal of totalizer 103 is proportional to its input signal, which is the output signal of totalizer 104, but it can never exceed the output signal of totalizer 102.

The output signal of totalizer 104 is proportional to its input signal which is the output signal of relay 97, but it can never exceed the output pressure signal of relay 96.

Thus the output pressure of totalizer 103 establishes the control point of regulator 84 and is dependent upon, first, the value of the output signal of relay 94. If that signal is zero gauge, the output signal of totalizer 103 is zero gauge. When it is greater than zero gauge, the output signal of totalizer 103 will be proportional to the output signal of totalizer 104 which, of course, is proportional to the output signal of relay 97.

So long as the output signal of totalizer 103 is zero gauge, regulator 84 will operate at its normal control point to maintain the intended or regulated pressure in header 64, unaffected by its loader 87. As the output pressure of relay 103 increases, the pressure to loader 87 increases causing regulator 84 to establish a lower controlled wind pressure in the header 64.

The output signal of totalizer 103 is delivered to the transducer 105. The transducer converts the pressure signal into an electric output signal which is transmitted by conductors 106 and 107 to a transducer 108 by which it is converted to a pneumatic signal for loading the loader 87. Transducer 108 may be at a substantial distance from the transducer 105 and located in the wind house or at a suitable central control station.

If the following conditions be assumed, the operation of the system of Figs. 3a and 3b will be understood readily:

(1) The required wind supply to furnace 50 is established when the pressure in the bustle pipe 54 is substantially equal to the pressure in header 64. Under those conditions the pressure difference across orifice 70 to which regulator 90 responds is substantially zero and the output pressure of regulator 90 is zero.

(2) If the wind pressure in header 64 as assumed in (1) above is higher than furnaces 51, 52 and 53 require, the dampers 75, 76 and 77 in pipes 67, 68 and 69 are modulated more or less between open and closed positions in order to maintain a predetermined wind volume rate to those furnaces. Therefore, the pressure drops across orifices 71, 72 and 73 will be higher than the drop across orifice 70.

So long as the resistances to the flow of wind through the charges of furnaces 50–53 remain unchanged, the pressure difference across orifices 71, 72 and 73 will remain higher than that across orifice 70 which should remain at a substantially zero value. However, if the flow to furnace 50 should increase because of a reduction in the resistance of the charge, a pressure difference develops across orifice 70. As that pressure difference increases with increased flow, the output signal of regulator 90 increases. As soon as it exceeds the set point of ratio relay 94 there will be an increase in the signal output of that relay as delivered to the pilot valve of cylinder 78 and to the valve supply of totalizer 102. Therefore, damper 74 will be actuated towards closed position and the wind flow to furnace 50 brought back to its regulated value unless the wind flow continues to increase because of a continued reduction in resistance.

Since it was assumed above that the dampers 75–77 would be modulated between open and closed positions, it follows that regulators 91–93 would have been sending control signals to the totalizers 103 and 104. Therefore, totalizer 103 will deliver a control force to transducer 105 that is a function of the output signals of relays 95, 96 and 97. Thus the loader 87 will receive a loading pressure which causes regulator 84 to reduce the pressure signals to the steam valve operators 83 and decrease the steam supply to the turbines. The blower speeds and the pressure in the header 64 are thereby so reduced that the wind pressure in header 64 and the flows to the furnaces are restored to their required values.

When the pressure in the header 64 has been thus reduced, the pressure drop across one of the orifices 70–74 will be lower than across the others. The pressure drop may be the least on orifice 70, or orifice 71, or orifice 72, or orifice 73. Whichever one has the lowest drop, its regulator will cause its power cylinder to open its damper wide the moment the output signal of that regulator is less than the set point pressure on its associated ratio relay.

The above described operation indicates that because of changes in resistance in the charges of the furnaces 50–53, the wind supply pressure in the header 64 has been too high.

If in the course of operation of the furnaces, the furnaces are not receiving sufficient wind and the output signal of either regulator 92 or 93 is zero, or less than the set point pressure on ratio relays 96 and 97, the output signal of totalizer 103 will be zero. Therefore, the loading pressure on loader 87 will be zero; consequently, the pressure in the header 64 will be increased to that value at which regulator 84 would normally maintain it without any loading pressure on loader 87. Should conditions again return to the assumed conditions of (1) supra, the damper 74 will be in wide open position because the lowest orifice pressure drop will be that across orifice 70.

Conceivably, the pressure differentials across the orifices 70–73 could be so low that all the dampers 74–77 would be in wide open position at one time. But such a condition can be avoided, if need be, by operating the ratio relays 94–97 at set point pressures that differ from each other but which will give the desired control of the rate of wind flow to the various furnaces. That can be effected by proper adjustments of the set point senders S94–S97.

From the foregoing it should be apparent to those skilled in this art that the totalizer 103 will deliver a signal that lies between zero and maximum depending on the value of the supply pressures to totalizers 102, 103 and 104 and the respective input signal pressures thereto.

*The power cylinders 46, 47, 78–81 as shown in Fig. 7*

The construction of the power cylinders 46, 47 and 78–81 of Figs. 2, 3a and 3b may be constructed as shown in Fig. 7 or in accordance with the construction shown in Fig. 2 of Donaldson Patent No. 2,243,944. The power cylinder comprises a cylinder 110 having a piston therein (not shown) and a piston rod 111 that extends upwardly through the upper cylinder head 112. It is connected by a link 113 to a damper arm 114 secured to the shaft on which the damper is mounted. That damper may be any one of the dampers shown in Fig. 2 or Figs. 3a and 3b. For purposes of description it may be considered that the damper of Fig. 7 is the damper 74 of Fig. 3a and that that damper is in pipe 66.

The power cylinder is provided with a pilot valve 115 which includes a valve stem 116 operated by a diaphragm 117 having a pressure receiving housing 118 carried by the cylinder. The pilot valve is provided with a supply pipe 119 to which a source of motive fluid under pressure may be connected, such as compressed air. The valve has two pressure outlets 120 and 121. These outlets lead to the upper and lower ends, respectively, for admitting pressure to either side of the piston. When the valve is in the neutral position shown in Fig. 7, both of the outlets 120 and 121 are closed. If the valve is raised from that position motive fluid passes from the supply pipe 119 through the valve into pipe 120 to the upper end of the cylinder causing the piston to move downwardly and actuating the damper 74 towards open position. If the valve is moved downwardly, the pressure supply is to the lower end of the cylinder through the connection 121 causing the piston to move upwardly and shift the damper towards closed position.

The valve 116 is actuated by the diaphragm 117 from pressure delivered to the housing 118 by a pipe 122. The pipe 122 corresponds to any one of the pipes 96a–99a of Figs. 3a and 3b, or the pipes 42a and 43a of Fig. 2. The valve 116 is returned to neutral position, when the piston has moved a given distance in response to a definite pressure being imposed on the diaphrgam 117. That return motion of the valve is accomplished by a bell crank 124 having a socket or cup 125 in which a spring 126 is seated. That spring is between the diaphragm and the socket. The bell crank has a roller 127 riding on an angle or cam bar 128 secured to side rod 130 which is attached to the piston rod as shown. The bell crank is turned by the bar in such a direction as to return the diaphragm and valve to neutral position. There is a side rod 131 on the opposite side of the cylinder and it also is connected to the piston rod. The lower ends of the side rods are connected by a cross head 132. The side rods are guided in slots in the cylinder heads as shown.

Assuming that there has been an increase in pressure on the diaphragm 117, the valve 116 is moved downwardly admitting pressure to the lower end of the cylinder causing the piston to move upwardly. As the piston moves upwardly, the cam bar 128 also moves upwardly, rotating the bell crank 124 clockwise thereby compressing the spring 126 and moving the diaphragm and the valve upwardly until it reaches the neutral position. The piston then comes to rest and will not move again until the pressure on the diaphragm 117 either increases or decreases. If the pressure decreases, the tension in the spring 126 moves the valve upwardly admitting pressure into the upper end of the cylinder and causing the piston to move downwardly. It will move downwardly until there is a balance between the force of the spring 126 and the force of the pressure on the diaphragm, at which time the valve is returned to its neutral position.

It is to be understood that when the piston in the cylinder is moving in either direction, the end of the cylinder towards which the piston moves is connected by the valve to exhaust.

Thus the power cylinder shown in Fig. 7 and utilized in the system shown in Figs. 2, 3a and 3b is one that has a definite position of its piston for every value of pressure applied to its pilot valve operating diaphragm 117.

*The regulators 42, 43, 84 and 90–93 as shown in Figs. 6 and 9 respectively*

The regulators 42, 43, 84 may be constructed as shown in Fig. 4 of Donaldson Patent No. 2,243,944 or as illustrated in Fig. 6 of the drawings. The regulators 90–93 may be constructed as shown in Fig. 9. The particular regulator shown in Fig. 6 is a loaded regulator. When used in the locations of regulators 42, 43 of Fig. 2 and of regulators 90–93 of Figs. 3a and 3b, the loader is not used. That is, it may be disconnected from any loading pressure source. When used in the location of the regulator 84 of Fig. 3b, the loading unit is utilized.

The regulator shown in Fig. 6 comprises a diaphragm 135 the marginal edge of which is clamped between housing parts 136 and 137 which thereby form pressure receiving chambers 138 and 139 on the upper and lower side of the diaphragm. The diaphragm is coupled by a link 140 to a yoke 141 having a knife edge 142, resting on a beam 143. The beam 143 is supported at one end on a knife-edge bearing 144 and is connected by a spring 145 at the other end to a lever 146. The lever 146 is pivoted as at 147. At a location between the pivot 147 and the end to which the spring 145 is connected is a push rod 148 connected to a loading diaphragm 149. That diaphragm is urged upwardly by a compression spring 150 disposed between a bearing plate 151 and the underside of the diaphragm. The marginal edge of the diaphragm is clamped between a support member 153 and a diaphragm housing 154, thereby forming a pressure-tight receiving chamber 155 on the upper side of the diaphragm. When the regulator of Fig. 6 is used as a loaded regulator as in the case of regulator 84, pressure is admitted to the chamber 155 through the signal pipe 108a to which the signal of transducer 108 is delivered.

The yoke 141 operates a valve 156 in a valve body 157. The valve body is supplied with supply pressure of constant value through a pipe 158. The valve body has an outlet 159 and an exhaust port 160. The outlet 159 would be connected to the appropriate signal pipe of the regulators 90–93 which have been indicated by the legends 90a–90b or the signal pipe 85 of the regulator 84.

The valve 156 is moved towards one or the other of the inlet and exhaust ports 158a, 160 of the valve body to thereby establish in the signal or the outlet pipe, a pressure that is proportional to the relative restrictions of those ports. The outlet pressure of the valve may vary from zero gauge as when the inlet port is completely closed, to the maximum value of the pressure in the supply pipe 158 which may, for example, be 60 p.s.i.g. Intermediate positions of the valve will establish corresponding intermediate values of signal output pressure.

To stabilize the regulator 84, it is provided with a damping device 162, that comprises a piston 163 connected by a spring 164 to the stem 140. The piston works in a cylinder 165 connected to the interior of a bellows 166 disposed in a pressure-tight housing 167. The bellows 166 works against a spring 168 so that it will take a definite position for each value of pressure supplied to the housing 167. The pressure to housing 167 is supplied by the outlet signal of the valve 156. When the pressure differential on the diaphragm 135 is such as to move it downwardly, the spring 164 is compressed, but the increased signal pressure in the housing 167 compresses the bellows 166 increasing the pressure on the oil in the dashpot on the underside of the piston. That pressure is dissipated through a needle valve 170 that controls a by-pass 171 whereby oil may flow from the space below the piston to the space above it and in the reverse direction when the diaphragm moves upwardly.

The point where the stem 140 passes through the housing members 136 and 137 is sealed by small diaphragm seals 172 and 173.

When the loader comprising the diaphragm 149 is not used, the tension in spring 145 determines the regulating point of the regulator. Under those conditions the regulating point of the regulator is higher so that it will maintain higher pressures or higher differentials across the diaphragm than when the loader is used. When the loader is used, increasing pressures on the diaphragm 149 cause the lever 146 to turn counterclockwise and relieve the tension in spring 145. Thus lower regulated differentials on the diaphragm will be established by the regulator.

The pressure differential acting on the diaphragm is that which develops across the respective orifices 40, 41. The pressure on the upstream side of any one of these orifices is the higher pressure and is delivered to chamber 138 while that on the low or down stream side is the lower pressure and is delivered to the chamber 139.

As the differential on the diaphragm 135 increases whether or not the loader is used, that is, whether or not any loading pressure is supplied to the chamber 155, the output signal pressure of the valve 156 will increase from the minimum value of say zero pounds gauge to the maximum value of the pressure supply at the inlet of the valve. Normally that pressure is 60 p.s.i.g. although it may have a different maximum value than the one given.

The regulators 90–93 differ from regulator 84 in that a gradient establishing means 162' has been substituted for the damping means 162. As shown in Fig. 9, the diaphragm 135 is directly connected through a spring 162a to the bottom of bellows 162'a. The signal pressure of the regulator acts through the bellows and spring 162a upon the diaphragm so as to balance the force of the differential pressure. Thus for every value of differential, the diaphragm will have a definite position and the signal output of valve 157 will be proportional to that differential.

*The ratio relays 94–97 as shown in Fig. 4*

The ratio relay shown in Fig. 4 represents the construction of the ratio relays 94–97 of Figs. 3a and 3b. That construction may also be in accordance with the ratio relay shown in U.S. Patent No. 2,669,129 or in Markson Patent No. 2,677,385. The relay of Fig. 4 comprises a base plate 176 on which is supported a beam 177 provided with a frictionless fulcrum 178. The fulcrum 178 may be in the form of a thin steel strip, one end of which is secured to a block 179 adjustably secured to the base plate 176 by a screw 180 and the other end of which is secured to a block 181. The block 181 is secured to the beam 177 by a clamp block 182 and screws 183, only one of which is shown.

The relay includes a signal receiving unit 184 to which signal pressure from any one of the regulators 92–95 is delivered and a set point pressure receiving unit 185. The pressure receiving unit 184 includes a diaphragm 186 having its central portion disposed in a circular aperture 187 in the base member 176. The marginal edge of that diaphragm is clamped between a bonnet 188 and the base member so as to form a pressure chamber 189 to which the regulator pressure signal is delivered. The central portion of the diaphragm is connected by a tubular strut 191 to the beam 177. Thus, as pressure is admitted to the chamber 189 the force of that pressure on the beam acts clockwise about the fulcrum 178.

The set point pressure receiving unit 185 is similar in construction, therefore, similar and corresponding parts are designated by the same reference characters with primes affixed.

The unit 185 is supported on members 192 carried by the base member 176. Pressure from any one of the set point senders S94–S97 is delivered to the chamber 189' and develops a force on the diaphragm that is transmitted to the beam 177. Since that pressure will be a fixed but adjustable pressure, the force acting on the beam will be counterclockwise and constant. Therefore, until the pressure in chamber 189 exceeds that in the chamber 189', assuming that the areas of the diaphragms are equal, the beam 177 cannot rotate clockwise as has been already explained in connection with Figs. 3a and 3b.

At the right-hand end of the beam 177 is a pressure sending and balancing unit 195. That unit comprises a diaphragm 196 having a preformed or central portion disposed in an aperture 197 in the base member 176. The marginal edge of that diaphragm is clamped between a bonnet 198 and the base member 176 as shown. The unit 195 includes an exhaust valve member 199 which is threaded into a strut 200 so that the central portion of the diaphragm 196 is clamped between them. The upper end of the member 199 has an exhaust port seat 201 that leads to the atmosphere. The exhaust port seat is controlled by a valve stem 202. The bonnet 198 is provided with an inlet or pressure supply valve body 202a. As shown, it is threaded into the bonnet and is provided with an inlet port seat 203. The seat 203 is controlled by a valve element 204 on the valve stem. The stem 202 is urged in a direction to close inlet port seat 203 by means of a compression spring 205 located between the inner end of the member 202a and a collar or flange 207 secured to the stem 202. The valve body 202a is supplied with pressure at a constant value, say 60 p.s.i.g. through a supply pipe 208.

When the beam 177 is tilted clockwise, the valve stem 202 moves downwardly thereby disengaging the element 204 from the inlet port seat and admitting pressure into the bonnet 198. That pressure acts on the diaphragm to turn the beam counterclockwise. When the turning moment developed by diaphragm 196 equals the net turning moments of the diaphragms 186 and 186' about the fulcrum 178, the beam 177 will be in neutral position at which time both the exhaust and the inlet ports of the valve are closed. The bonnet 198 is provided with an outlet port to which the signal pipes 94a to 97a of Figs. 3a and 3b would be connected.

In order to provide the ratio relay with automatic reset and rate action, pressure receiving unit 210 is provided. That unit includes a diaphragm 211, the marginal edge of which is clamped between a bonnet 212 and the support structure 213 by which the unit 210 is secured to the base member 176. The diaphragm 211 exerts a force on the beam 177 that is proportional to the pressure delivered to the bonnet, through a strut 214.

As shown in Figs. 3a and 3b the output signal or pressure of the ratio relays depicted by Fig. 4 is delivered to the unit 210 through pipe having therein a needle valve. These needle valves are designated 94c–97c and the pipes 94d—97d as shown in Figs. 3a and 3b. To each of the pipes 94d–97d a volume chamber VC is connected. That chamber gives ballast to the rate action and automatic reset means 98–101. The effect of the pressure on the diaphragm 211 is to ultimately neutralize the force exerted by the diaphragm 196 on the beam and the rate at which that force is neutralized is controlled by the volume chamber and the needle valve.

So long as the pressure in the pressure receiving unit 184 exceeds that of the set point unit 185, the output pressure of the unit 195 will tend to be the maximum value of the pressure in the supply pipe 208. However, until the pressure in the housing 212 is equal to that in the bonnet 198, the tendency is for the ratio relay to transmit a pressure signal that is proportional to the difference between the pressure in chamber 189 and the set point pressure in chamber 189′. But that difference diminishes as the pressure in housing 212 increases. If the output pressure is not sufficient to restore the controlled condition to equilibrium, it will continue to increase, ultimately reaching its maximum value, which is the value of the supply pressure for the valve.

*The set point senders S94–S97 and the totalizers 102–104 as shown in Fig. 5*

The construction of set point senders S94–S97 and the totalizers 102–104 illustrated in Figs. 3a and 3b may be that shown in Fig. 5. As shown in Fig. 5, it comprises a diaphragm 220, the marginal edge of which is clamped between a bonnet 221 and a ring or annular member 222. It also comprises a diaphragm 223, the marginal edge of which is clamped between a bonnet 224 and an annular member 225. A spacer 226 is located between the annular members 222 and 225 and the assembly of the bonnet 221, the members 222 and 225 and the bonnet 224 are rigidly secured with bolts 227, only one of which is shown.

The central portion of diaphragm 220 is clamped between the flange 228 of a bolt 229, and a backing plate 230 that is threaded onto the shank of the bolt. The flange 228 includes a head 231 having an exhaust port seat 232 at the center thereof. That seat communicates with a passageway 233 that leads to an annular space 234 between the stem of the bolt 229 and bellows 235. As shown, one end of the bellows is secured as by welding or brazing to the backing plate 230, the other end is similarly secured to a backing plate 236. The backing plate 236 is secured to the stem of a flanged bolt 237 as shown. A nut 240 threaded on the left-hand end of the bolt 229 secures the diaphragm assemblies firmly together.

The bonnet 221 is provided with a valve body 242 having an inlet port 243 to accommodate a supply pipe 244. That supply pipe receives the supply pressure for the device. Within the bonnet 221 is a valve stem 245, one end of which seats in the exhaust port seat 232 while the other end controls the inlet port. The valve stem is provided with a light compression spring 247 which tends to urge the valve stem to the left or in a direction to close the inlet port seat. A relatively strong compression spring 248 is disposed between the other end of the bonnet and the diaphragm 220 and tends to urge it to the left.

In the bonnet 224 is an adjustable compression spring 249. The inner end of that spring bears against the flanged member 237 and its outer end receives a flanged bearing member 250, to which is connected a threaded screw 251 that extends outside the bonnet and carries a handwheel 252. By turning the handwheel right or left, the tension in spring 249 can be increased or decreased.

When the device of Fig. 5 is used as a set point sender as is the case with the senders S94–S97, the chamber in the bonnet 224 is vented to the atmosphere. The pressure transmitted by the sender in that situation, to the respective ratio relays 94–97, is established by turning the handwheel until the tension of the spring 249 exerts such a force on the diaphragm 220 that a balancing pressure must be established by the valve in the chamber of the bonnet 221. When that chamber pressure equals the force of the spring 249, equilibrium is reached and the set point pressure is established.

When the device of Fig. 5 is used for the totalizers 102–104, the valve supply pressure is connected to the pipe 244 and the outlet or output pressure of the device is discharged through a port 256. The input pressure to the device is supplied through port 257. When the device is used as a totalizer it can be assumed that the tension in spring 249 is adjusted until it equals the force of the spring 247 in the bonnet 221. When that adjustment is made, the output signal pressure at port 256 will be equal to the input pressure at the port 257.

In the simplified version of the set point senders S94–S97 as shown in Figs. 3a and 3b, only one diaphragm is used. That diaphragm is urged in one direction by a spring which requires an output pressure that will develop a force on the diaphragm equal and opposite to that of the spring. By the simple expedient of turning a handwheel as shown, the pressure delivered to the various ratio regulators 94–97 can be manually preset.

*Figure 8*

In a control system such as shown in Figs. 3a and 3b it may be important to the operators of the blast furnace to know the position of the various dampers 74–77 at any time. That position may be made known at a remote point by utilizing a signal transmitting valve or other indicating device 265, as shown in Fig. 8. The particular device illustrated in Fig. 8 is a valve comprising a body 266 having a valve 267 therein that controls the inlet and exhaust port seats 268 and 269 of the valve body. The pressure supply for the valve is derived from a supply pipe 270 to which pressure at a constant value may be supplied. The output pressure of the valve is proportional to the position of the valve 267 with reference to its inlet and outlet ports. Therefore, the outlet pressure of the valve as delivered to a sending line 272 will be proportional to the relative throttling of the inlet and exhaust ports.

The position of the valve element 267 is controlled by a cam 273 on the damper shaft 274. Thus as the damper is moved from wide open to closed position, the valve will indicate its position at any time by the magnitude of the pressure delivered to the line 272. The pressure in line 272 may be measured by a gauge 275 which if calibrated in terms of damper position will give the operator the valve or damper position.

In the arrangement shown in Fig. 8, the valve 267 is in its wide open position when the valve is closed. Therefore, as the valve 267 is moved towards the position where the inlet port is closed, the pressure will decrease indicating inversely the position of the damper with respect to the pressure. The valve may be so arranged so that its sending pressure is linear with respect to the damper position as the damper travels from closed to open position. But in a system such as shown in Figs. 3a and 3b it is more important to know how much the dampers have been shifted towards closed position because that indicates that the wind pressure in the supply header may be too high for the wind requirements of the various furnaces.

*Transducers 105 and 108*

The transducer 105 may be constructed as shown in Fig. 1 Markson Patent No. 2,634,747. It comprises a bellows 280 mounted in a pressure tight housing 281 to which the pressure signal in line 103a from totalizer 103 is delivered. The bellows exerts a force on beam 283 through a push rod 282, the beam 283 being mounted on a fulcrum 284. One end of the beam actuates the core 285 of a differential transformer 286. The output of that transformer varies from zero to the maximum voltage of the transformer in one direction only and is delivered to an amplifier 287. The output of that amplifier is rectified by a rectifier 288 and impressed on a coil winding 289 of a magnetic balancer that includes a permanent magnet 290. The coil winding is connected to the beam 283 and exerts a force that opposes and balances the bellows force on the beam. Therefore, for each input of pressure to the housing 281 there is a definite output from the differential transformer 286 and that output after being amplified and rectified develops a balancing force in the coil 289.

The transducer 105 is provided with a stop 292 that limits the output of the differential transformer 286 to an output value that varies from neutral or zero of the transformer to a maximum value which maximum value always is in the same direction from neutral and never reverses through zero.

The output of the rectifier 288 passes not only through the coil 289 but is also carried by the conductors 106 and 107 to the transducer 108.

The transducer 108

The transducer 108 comprises a coil winding 295 associated with a permanent magnet 296. The winding 295 is coupled to a beam 297 mounted on a fulcrum 298. The beam 297 actuates an escapement valve 299 disposed within a valve body 300. The valve body has an inlet port 301 connected to a pressure supply pipe 302 in which pressure such as compressed air, is maintained by a supply source not shown, at a constant value, say 60 p.s.i.g. The valve body has an exhaust port 303 leading to the atmosphere and an outlet port 304 that is connected by a pipe 305 to a housing 306 in which a balancing bellows 307 is located. The bellows acts through a push rod 308 on the beam. The force developed by the bellows 307 balances the opposing force of the coil winding 295. Thus, as the valve 299 is actuated by the coil winding 295 from its wide open position at the exhaust port to the wide open position at the inlet port, the pressure in pipe 305 and acting on the bellows 307 will vary from zero gauge to the maximum value of the supply pressure in the pipe 302. The pipe 305 also delivers the loading pressure to the load 87 of regulator 84 through pipe 108a.

Thus the transducer 105 transmits an electric signal that is proportional to the signal in pipe 103a of the totalizer 103 and that signal is received by the transducer 108 and converted to a proportional pneumatic pressure by the valve 299. That pressure so loads the loader 87 of the regulator 84 that the control point pressure of that regulator may be adjusted automatically to maintain the wind pressure in the header 64 at the value called for by the interaction of the totalizers 102–104 as determined by the lowest of the pressure differentials across the orifices 70–73.

Having thus described the invention, it will be apparent to those of ordinary skill in the art to which it pertains that various modifications and changes may be made in the illustrated embodiments without departing from either the spirit or the scope of the invention.

Therefore, what is claimed as new and desired to be secured by Letters Patent is:

1. A system for controlling the supply of wind to the bustle pipes of a plurality of blast furnaces, comprising a common wind supply header, a plurality of blowers having their outlets connected to the header, an adjustable speed prime mover for driving each blower, regulating means responsive to the wind pressure in the header for so adjusting the prime mover speeds as to maintain a given regulated pressure in the header, a wind supply pipe for connecting the header to the bustle pipe of each furnace, each said supply pipe having an orifice and a flow control valve therein, and a power operator for actuating the valve between open and closed positions, a regulator responsive to the pressure drop across said orifice for developing a control signal that varies in accordance with said pressure drop, a relay for transmitting control signals to said power operator, means for providing a constant but adjustable set point signal, said relay being provided with means responsive to said regulator control signal and said set point signal, whereby said relay transmits a modulating control signal to said power operator when the regulator signal is above the set point signal and causes the power operator to actuate the control valve to open position when the regulator control signal is less than the set point signal and totalizing means jointly responsive to the control signals of said relays for generating and transmitting a signal to the header pressure regulating means to change the regulating point thereof when the control signal of one of said orifice responsive regulators is above the set point signal of its associated relay.

2. A system as in claim 1 in which the common header regulating means is provided with a loader for changing the control point thereof in response to the magnitude of the signal of the totalizing means delivered thereto.

3. A system as in claim 1 in which the relay comprises a signal generating and transmitting force producing means, a set point signal responsive force producing means, a regulator signal responsive force producing means, said set point signal and regulator signal responsive force producing means being in opposed relation to each other and to the force of said signal generating and transmitting means whereby the signal generator and transmitter is biased to a minimum signal until the regulator signal exceeds the set point signal.

4. A system for supplying wind to the bustle pipes of a plurality of blast furnaces from a common wind supply header to which wind is supplied by a plurality of blowers driven by adjustable speed prime movers, said system comprising means for adjusting the speeds of the prime movers, a bustle supply pipe connecting each bustle pipe to the header, an orifice in each bustle supply pipe, a regulator for each of the respective bustle supply pipes and responsive to the pressure drop across the respective orifice therein for developing a control force whose magnitude is proportional to the pressure drop, a control valve in each pipe, a positioner for actuating each valve, a set point relay for each regulator and responsive to its signal for delivering a positioner control signal only when the regulator signal exceeds the set point of the relay, each positioner having means actuated by the control force of its associated set point relay for actuating the same and its valve to a definite position for each value of set point relay signal and to open position when the set point is greater than the regulator signal, and means responsive jointly to the control forces of said set point relays for so adjusting the prime mover speeds that the pressure in the bustle pipe of one of the furnaces will be substantially equal to the pressure in the common header.

5. The combination with a plurality of blast furnaces each having a bustle pipe, a common wind supply header, a supply pipe connecting each bustle pipe to the header, an adjustable source of supply of wind for said header, means responsive to the header pressure for so controlling the wind supply that a predetermined regulated pressure is maintained in the header, wind flow control means for establishing modulated and unmodulated flow of wind in each furnace bustle supply pipe, means responsive to the rate of flow of wind through each pipe for delivering a signal that varies with said flow, a set point relay for each flow control means, each of said set point relays being responsive to the signal of its rate of flow responsive means for maintaining said flow control means in unmodulating condition while the set point exceeds the rate of flow responsive means signal, and in flow modulating condition when said signal exceeds the set point and means jointly responsive to the control signals of said set point relays for generating and transmitting a signal to the header pressure regulating means to change the regulating point thereof when the control signal of one of said wind flow control means is above the set point signal of its associated relay.

References Cited in the file of this patent

UNITED STATES PATENTS

| | | |
|---|---|---|
| Re. 20,473 | Lewis et al. | Aug. 17, 1937 |
| 1,662,851 | Ebner | Mar. 20, 1928 |
| 1,879,575 | Standerwick | Sept. 27, 1952 |
| 2,192,885 | Avery | Mar. 12, 1940 |
| 2,243,944 | Donaldson | June 2, 1941 |
| 2,677,385 | Markson | May 4, 1954 |
| 2,689,780 | Rice | Sept. 21, 1954 |
| 2,774,368 | Jones | Dec. 18, 1956 |

FOREIGN PATENTS

| | | |
|---|---|---|
| 563,008 | Germany | Nov. 1, 1932 |
| 729,563 | Great Britain | May 11, 1955 |